J. & W. SADUS.
AUTOMOBILE SLED.
APPLICATION FILED MAR. 7, 1914.
1,109,182.
Patented Sept. 1, 1914.
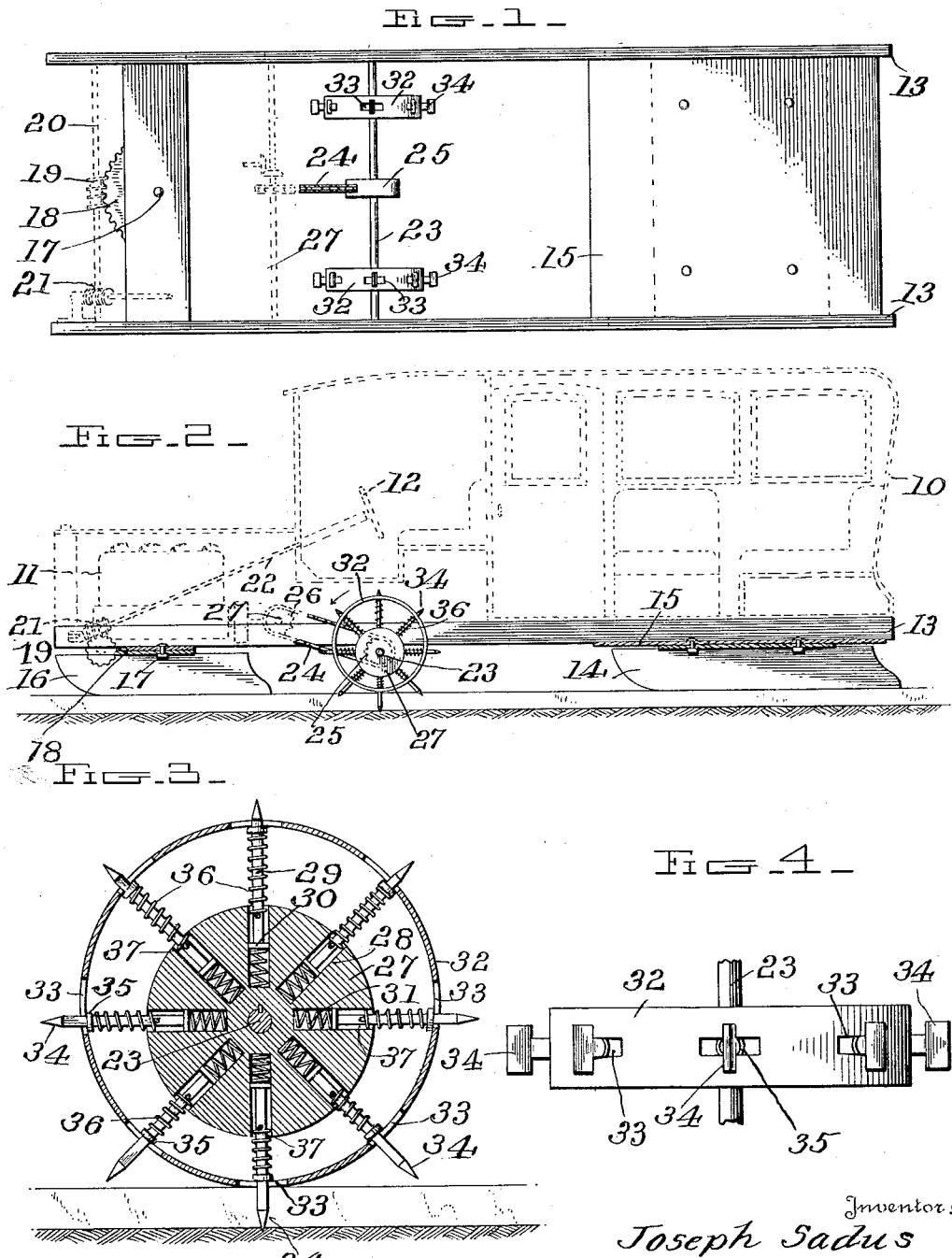
Witnesses
Inventors
Joseph Sadus
Walenty Sadus
A. M. Wilson
Attorney

UNITED STATES PATENT OFFICE.

JOSEPH SADUS AND WALENTY SADUS, OF FILBERT, WEST VIRGINIA.

AUTOMOBILE SLED.

1,109,182.  Specification of Letters Patent.  Patented Sept. 1, 1914.

Application filed March 7, 1914. Serial No. 823,071.

*To all whom it may concern:*

Be it known that we, Joseph Sadus and Walenty Sadus, subjects of the Emperor of Austria-Hungary, residing at Filbert, in the county of McDowell and State of West Virginia, have invented certain new and useful Improvements in Automobile Sleds, of which the following is a specification.

This invention relates to certain new and useful improvements in automobile sleds and more especially relates to a propulsion means for the same.

The primary object of the present invention is to provide a sled or sleigh adapted to be propelled upon runners by means of a motor carried thereby and movement being effected by means of traction wheels propelled by the motor and especially designed for use upon snow and ice.

A further object of the device is to equip the ordinary automobile body with runners instead of wheels and to provide a traction means for engaging the snow and ice covered road-way for imparting motion thereto under the influence of the usual motor, the sleigh being adapted for steering by the usual form of steering mechanism.

A still further object is to provide a special design of traction wheel for employment upon automobile sleighs and one that is of service upon snow and ice and having an arrangement of resiliently positioned calks circumferentially thereof.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a plan view of a sleigh runner portion of the automobile sleigh with the present device arranged thereon, the motor and steering connections being shown in dotted lines. Fig. 2 is a central vertical sectional view thereof showing the sleigh body with its motor in dotted lines as mounted thereon. Fig. 3 is a vertical sectional view of one of the traction devices detached, illustrated as operatively positioned, and, Fig. 4 is a top plan view thereof.

Referring more in detail to the drawings, a limousine body 10 is illustrated in Fig. 2 in dotted lines having a motor 11 and a steering wheel 12, all of which is mounted upon our improved motor-operated sleigh construction shown in full lines and being of the form illustrated in Fig. 1.

For receiving the sleigh body, the side rails 13 are provided positioned upon the rear runners 14 and thereby forming the rear platform 15 while front runners 16 are forwardly positioned and centrally pivoted upon the bolt 17 for turning by the steering mechanism to effect the desired course of the sleigh. The forward runners 16 are provided with a gear wheel 18 arranged concentric with the bolt 17 and adapted to mesh with the worm 19 upon the transverse shaft 20 which shaft is turned by the worm 21 of the steering wheel shaft 22 in the usual manner.

The power shaft 23 is journaled transversely beneath the side rails 13 and substantially beneath the front seat of the sleigh body and is adapted to be revolved by the motor 11 in the usual manner and here shown as having a sprocket drive chain 24, while the casing 25 is adapted for covering a sprocket wheel (not shown) and preferably also some form of differential gears. Said sprocket chain is adapted to run over the sprocket 26 of a counter-shaft 27 operated in any desired manner by the motor 11 and may also be provided with any form of clutching mechanism whereby different speeds may be imparted as well as the sleigh being given a rearward movement.

The shaft 23 is provided with a desired number of spiked traction devices after the manner illustrated in Figs. 3 and 4 and mounted upon said shaft by means of disks 27 keyed thereto. Further referring to this construction, it will be seen that the disk 27 is provided with a plurality of radial bores or sockets 28 slidably receiving therein the rods 29 movable toward and from the shaft 23 and provided with heads 30 within said bores for giving more positive direction to the rods as well as a seating surface for coiled springs 31 positioned between said heads and the bottoms of the bores.

A comparatively broad rim 32 is provided positioned normally concentric with the shaft 23 and disk 27 and having the rods 29 projecting through slots 33 in the tread thereof, each of said rods being provided with a sharpened calk or head 34 outwardly of said rim and adapted for forming a gripping tread surface therefor.

A washer 35 encircles each of the rods 29 and is positioned in contact with the inner face of the rim and adjacent the slots 33 thereof by the springs 36 which encircle said rods and have their inner ends engaging fixed pins 37, transversely positioned in said rods and whereby a cushioning effect is imparted to the rods during a rotation of the wheel, said springs being compressed when the adjacent portion of the rim contacts a surface as shown by the lowermost rod in Fig. 3.

From this description the complete operation will be apparent. The sleigh structure illustrated in Fig. 1 having the automobile body positioned thereon as noted in Fig. 2, the motor is employed for revolving the shaft 23 and the power traction devices keyed thereto while the front runners of the sleigh are operated for steering by means of the steering wheel 12.

The rim 32 is resiliently mounted with respect to the hub 27 by means of the springs 31 and 36 and whereby both the contact of the rim as well as of the arm-carried calks is cushioned during the rotation of the wheel and a traction means results especially adapted for movement over snow and ice of different depths. It is thus apparent that a movement of the traction wheels in the direction indicated by the arrow in Fig. 2 propels the automobile sleigh forwardly, while a reverse movement thereof results in a backward movement of the sleigh.

While we have herein shown and described the preferred embodiment of our invention, we do not wish to limit ourselves thereto, as various forms and modifications may be had which will fall within the spirit and scope of the invention.

What we claim is:

1. In a device of the class described, a driven shaft, disks secured thereto adjacent the ends of the shaft, each having radial bores, rims positioned normally concentric with said disks, each provided with slots extending therethrough, rods slidably-mounted in the bores of each disk and projecting through the slots of the rims, coil-springs encircling the rods between the rims and disks, and confining means carried by the rods for said springs.

2. In a device of the class described, a driven shaft, a disk secured thereto and provided with radial bores, a rim normally concentric with the disk and provided with slots therethrough, rods slidably-mounted in the bores of said disk and projecting through the slots of said rim, said rods forming a support for the rim and said slots permitting the rim to have limited rotary movement independent of the disk and shaft, and means for holding the rim in spaced relation with respect to the disk.

3. A device of the class described comprising a driven shaft, a disk concentrically keyed thereto and having radial bores therein, a rim normally positioned concentric with said disk and shaft and provided with slots therethrough, coil springs positioned within and contacting the bottoms of said bores, rods slidably positioned in said bores and seated upon said springs and projecting through said slots, a transverse pin secured to each of said rods, a washer slidably-mounted upon each of said rods, outwardly of said pins, and a spring encircling each of said rods and positioned between the pin and washer carried thereby.

In testimony whereof we affix our signatures in presence of two witnesses.

JOSEPH SADUS.
WALENTY SADUS.

Witnesses:
ALEXANDER C. WARADY,
PHILIP TUSK.

---

Copies of this patent may be obtained for five cents each, by addressing the "Commissioner of Patents, Washington, D. C."